United States Patent
Hertel et al.

(10) Patent No.: US 10,601,888 B2
(45) Date of Patent: *Mar. 24, 2020

(54) START-OVER IN ADAPTIVE STREAMING

(71) Applicant: Amazon Technologies, Inc., Reno, NV (US)

(72) Inventors: Gary Thomas Hertel, Beaverton, OR (US); Greg Kenneth Truax, Portland, OR (US); Michael Vidyadhar Kale, Lake Oswego, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/864,812

(22) Filed: Jan. 8, 2018

(65) Prior Publication Data

US 2018/0131739 A1 May 10, 2018

Related U.S. Application Data

(63) Continuation of application No. 14/223,298, filed on Mar. 14, 2014, now Pat. No. 9,866,603.

(51) Int. Cl.
*H04L 29/06* (2006.01)

(52) U.S. Cl.
CPC ........ *H04L 65/605* (2013.01); *H04L 65/4084* (2013.01); *H04L 65/80* (2013.01)

(58) Field of Classification Search
USPC ................................................. 709/231, 200
See application file for complete search history.

(56) References Cited

U.S. PATENT DOCUMENTS

| | | |
|---|---|---|
| 9,866,603 B1 | 1/2018 | Hertel et al. |
| 2002/0091762 A1* | 7/2002 | Sohn ............... G06F 3/0481 709/203 |
| 2013/0086631 A1 | 4/2013 | Archer |
| 2014/0150019 A1 | 5/2014 | Ma |
| 2014/0230003 A1* | 8/2014 | Ma ............... H04N 21/231 725/115 |
| 2014/0281010 A1 | 9/2014 | Panje |

OTHER PUBLICATIONS

Non-Final Office Action issued in corresponding U.S. Appl. No. 14/223,298 dated Jan. 12, 2017.
Final Office Action issued in corresponding U.S. Appl. No. 14/223,298 dated Jul. 12, 2017.
Notice of Allowance issued in corresponding U.S. Appl. No. 14/223,298 dated Dec. 15, 2017.

* cited by examiner

*Primary Examiner* — El Hadji M Sall
(74) *Attorney, Agent, or Firm* — Hogan Lovells US LLP (57) ABSTRACT

In an example, a processing device is provided. The processing device may be configured to determine whether to send a first version of a stream manifest corresponding to a received a selection of one of a plurality of stream variants of a video content asset. The processing device may be configured to, in response to determining to not send the first version, send a second different version of the stream manifest. In an example, the first version includes only a subset of a plurality of entries included in the second version and/or a bootstrap current media time that is different than an actual current media time.

17 Claims, 6 Drawing Sheets

START-OVER IN ADAPTIVE STREAMING

CROSS-REFERENCES TO RELATED APPLICATIONS

This application is a continuation of allowed U.S. application Ser. No. 14/223,298, entitled "START-OVER IN ADAPTIVE STREAMING," filed Mar. 24, 2014; of which the full disclosure of this application is incorporated herein by reference for all purposes.

COPYRIGHT NOTICE

© 2014 Elemental Technologies, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

BACKGROUND OF THE INVENTION

Adaptive streaming, e.g. adaptive bitrate streaming, involves adjusting a media stream in real time based on factors such as a user's bandwidth, CPU capacity, etc. Stream variations may have different bitrates, different audio codecs, resolutions, or the like, or combinations thereof.

Adaptive streaming is sometimes used to provide content live over the Internet. With live streaming, if a user joins a live video stream after a start time of the live video stream, the user's player may start playing the video at the current play time. If the user wishes to watch the video from the beginning, the user may drag a scrub bar to a position corresponding to the beginning.

Dragging the scrub bar may be an inconvenience, or worse, could spoil the experience of watching the video from the beginning (for example a user may see or hear a current score in a sporting event before the changes by dragging the scrub bar are complete, which could ruin the experience of watching the sporting event from the beginning). A known solution is to create more than one streaming media, for example, a first live streaming media and a second streaming media corresponding to the previously streamed portion of the content.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

In an example, a processing device is provided. The processing device may be configured to determine whether to send a first version of a stream manifest corresponding to a received a selection of one of a plurality of stream variants of a video content asset. The processing device may be configured to, in response to determining to not send the first version, send a second different version of the stream manifest. In an example, the first version includes only a subset of a plurality of entries included in the second version and/or a bootstrap current media time that is different than an actual current media time. A known video player receiving the first version may be caused to start playback at the beginning of the content instead of close to live playback.

Additional aspects and advantages of this invention will be apparent from the following detailed description of preferred embodiments, which proceeds with reference to the accompanying drawings.

DETAILED DESCRIPTION OF PREFERRED EMBODIMENTS

Adaptive bitrate video delivered via HyperText Transfer Protocol (HTTP) may follow a multi-step technique. A variant manifest, e.g. a top/set level manifest (e.g. a bitrate playlist), may be requested via an HTTP command (i.e. HTTP GET) from a client device. The variant manifest may contain Universal Resource Locators (URLs) that point to all available streams, e.g. all available quality levels, for a given media asset.

A client player may select an appropriate stream and request individual media segments or fragments of the media asset for playback via HTTP GET. When the client device receives each segment or fragment, the received content may be displayed to a user.

The client device may at times request subsequent stream manifests, e.g. second/stream level manifests (e.g. playlists), for additional segments/fragments to download. A more recent segment or fragment discovered by sending another request for a stream manifest will be displayed in sequence with previously received segments or fragments. Hence, a continuous playout beginning with the starting location used by the client after receiving the previous stream manifest may be displayed on the client device.

Figure 1:
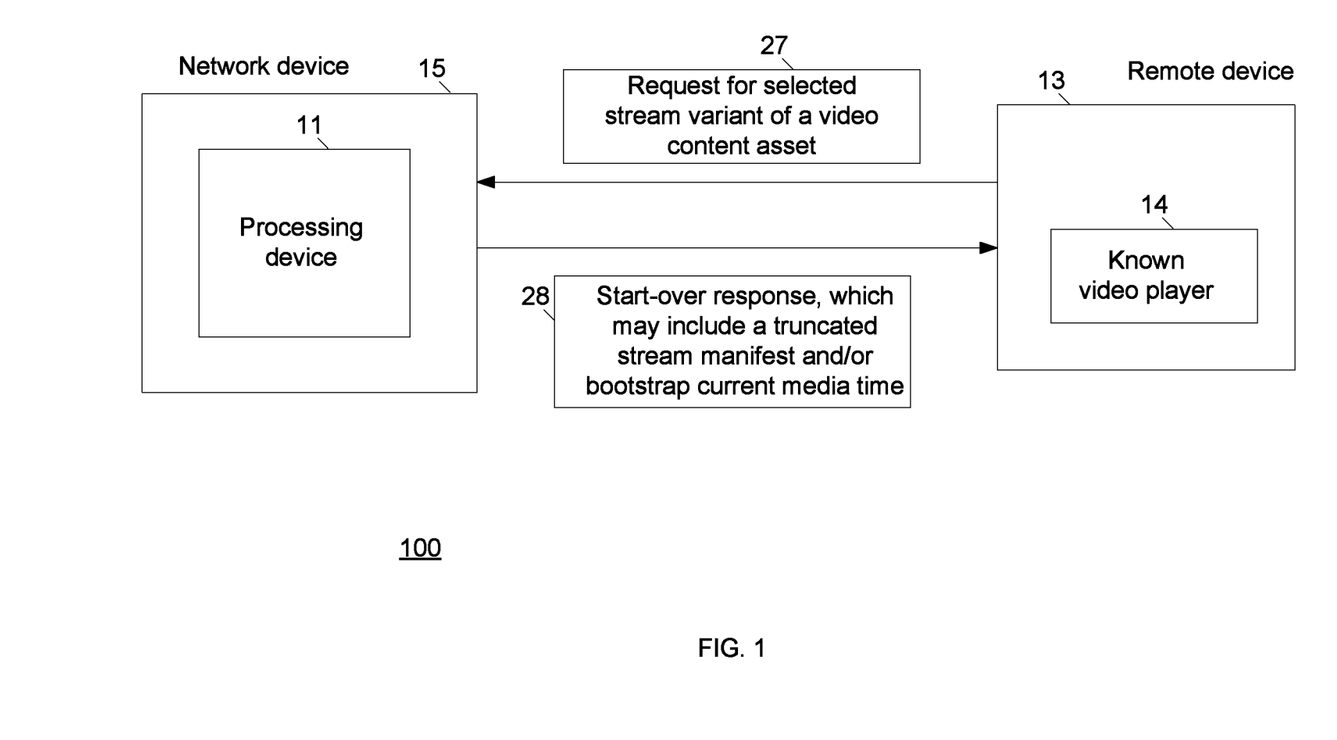
FIG. 1 illustrates a system to enable start-over in adaptive streaming.

FIG. 1 illustrates a system to enable start-over in adaptive streaming.

The system 100 includes a network device 15 and a remote device 13 including a known video player 14. It should be appreciated that the network device 15 may include any number of network elements, e.g. a single server, two or more servers, etc.

The processing device 11 of the network device 15 may be configured to process requests from remote device 13 for content delivered via adaptive streaming, e.g. adaptive bitrate streaming. For example, processing device 11 may receive request 27 for a selected stream variant of a video content asset. Processing device 11 may be configured to, in response to receiving a request for a selected stream variant of a video content asset, transmit a start-over response 28, which may include a truncated stream manifest and/or a bootstrap current media time.

Figure 2:
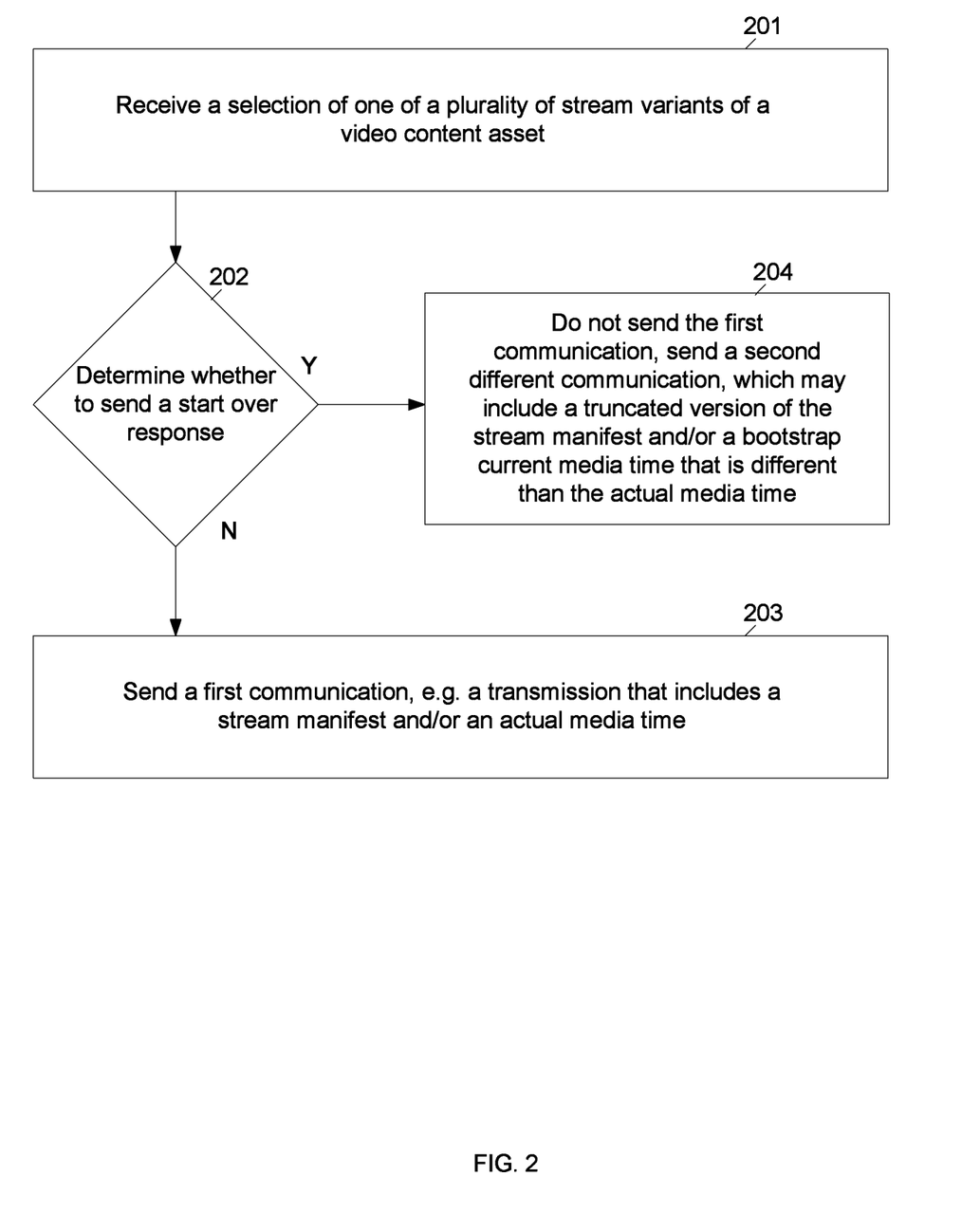
FIG. 2 illustrates a flow chart showing operation of the processing device 11 of FIG. 1.

FIG. 2 illustrates a flow chart showing operation of the processing device 11 of FIG. 1.

In block 201, processing device 11 may receive a selection of one or more of a plurality of stream variants of a video content asset. The selection may be received after providing a variant manifest.

In diamond 202, processing device 11 may determine whether to send a start-over response in response to receiving the selection. In response to determining to not send the start-over response, in block 203 processing device 11 may send a first communication, e.g. a transmission that includes a stream manifest and/or an actual media time. In response to determining to send the start-over response, in block 204 processing device 11 may send a second communication that is different than the first communication. The second communication may include a truncated version of the stream manifest and/or a bootstrap current media time that is different than the actual media time.

Figure 3:
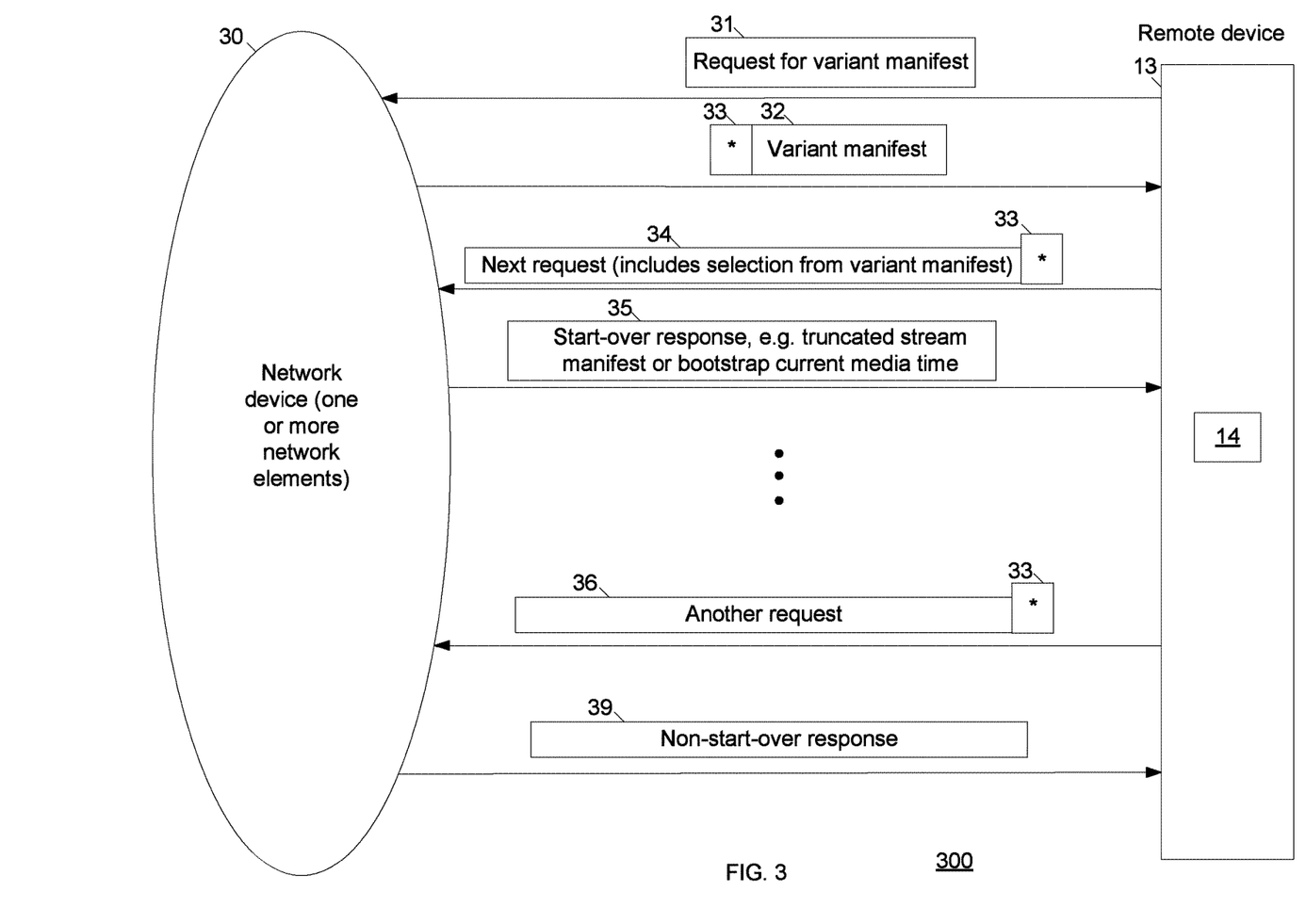
FIG. 3 illustrates a signaling diagram showing operation of a system for enabling start-over in adaptive video streaming.

FIG. 3 illustrates a signaling diagram showing operation of a system for enabling start-over in adaptive video streaming.

The system 300 includes a network device 30 (i.e. one or more network elements) and the remote device 13 having the known video player 14. The network device 30 receives a request 31 for a variant manifest. The network device 30 generates, e.g. generates responsive to receiving the request 31, a data pattern 33. In an example, the data pattern 33 includes a time of receipt of the request 31 and/or is based on the time of receipt of the request 31.

The network device 30 sends a transmission responsive to receiving the request 31. The transmission includes the variant manifest 32 and the data pattern 33. In an example, the data pattern 33 is attached, e.g. appended, to each of the links inside of the variant manifest 32. In an example, appending the data pattern 33 to a link may include appending the data pattern 33 to a URL.

The remote device 13 may transmit a next request 34 after receiving the variant manifest 32. The remote device 13 may use one of the links having the data pattern 33 attached thereto to send the next request 34. Therefore, the network device 30 may receive the next request 34 having the data pattern 33 attached to a link included in the next request.

In an example where the network device 30 comprises more than one network element, the next request 34 may be received at a different network element than the network element that transmitted the variant manifest 32. For example, for scaling reasons a different server may receive the next request 34 than a server receiving the request 31. In an example, the recipient network element for the next request 34 may discover the data pattern 33 included with the next request 34. For example, the network element discovers the data pattern 33 appended to a link of the next request 34.

In response to receiving the next request 34 and the data pattern 33, the network device 30 may determine whether to send a start-over response. In an example, the network device 30 may determine whether to send a first truncated stream manifest corresponding to the received selection. In response to determining to not send the first truncated stream manifest, the network device 30 may send a second stream manifest that is different than the first truncated stream manifest. The first truncated stream manifest may include only a subset of a plurality of entries, e.g. a plurality of links, included in the second stream manifest.

In an example, the network device 30 determines whether to send a start-over response using the data pattern 33. For example, the data pattern 33 may include a time of receipt, and the network device 30 may determine a difference between a time of receipt of the request corresponding to the selection and the time of receipt indicated by the data pattern 33. Network device 30 may determine whether the difference is less than a threshold. In an example, the threshold may be ten seconds. The network device 30 may send the start-over response responsive to determining that the difference is less than the threshold.

If the start-over response 35 is transmitted, the known video player 14 will start playing a different segment or fragment other than a most recent segment or fragment. Some known video players 14 are configured to start playback using a segment or fragment at the end or near the end of a stream manifest, which may be close to live playback in the case of a complete stream manifest. However, in an example, the start-over response 35 includes a truncated version of the stream manifest. Furthermore, if the truncated version of the stream manifest includes only segment(s) or fragment(s) associated with a start of the content, then such a known video player may be caused to start playback at the beginning of the content instead of close to live playback.

In an example where the known video player 14 utilizes HTTP Dynamic Streaming (HDS), the start-over response 35 may include a bootstrap current media time, i.e. an HDS bootstrap. The bootstrap current media time is different than an actual current media time, and may correspond to the start or near the start of the content. The bootstrap data may be embedded in a stream manifest and/or in a separate file. In the case of a separate file, the data pattern 33 may be appended to a URL corresponding to the separate file. The bootstrap time may cause a known video player utilizing HDS to be caused to start playback at the beginning of the content instead of close to live playback. If the network device 30 sends more than one start-over response, the bootstrap current media times may count up N seconds at a time, e.g. one second at a time. This allows the Current Media Time utilized by the HDS based video player to keep advancing, allowing playback, but starts playback at the beginning of the content.

The remote device 13 may transmit another request 36 after receiving the start-over response 35. The remote device 13 may use one of the links having the data pattern 33 attached thereto to send another request 36. Therefore, the network device 30 may receive another request 36 having the data pattern 33 attached to a link included in another request 36.

The inclusion of the data pattern 33 may cause the network device 30 to repeat the determination received responsive to receiving the next request 34. However, with another request 36, the determined difference may not be less than the threshold. If so, the network device 30 may determine to not send a start-over response for another request 36, e.g. may send non-start-over response 39. The response 39 may include non-truncated version of a stream manifest (i.e. the complete stream manifest) and/or an actual current media time. Hence, a continuous playout beginning with the starting location used by the video player 14 after receiving a previous stream manifest may be displayed on the remote device 13.

In the example above, the data pattern 33 is included in a transmission having a variant manifest. However, it is possible and practical to apply the principles described herewith without attaching the data pattern 33 to a link in the variant manifest. For example, in another example the network device 30 may pass the time of receipt or a code indicating the time of receipt to the remote device 13 using a cookie. Upon receiving a next request 34, the network device 30 may check the remote device 13 for the cookie, and determine the time difference using information from the cookie.

In yet another example, the network device 30 may check the remote device 13 for the cookie, and if the cookie is not found (which may occur if the remote device 13 has disabled cookies), the network device 30 may then determine whether the next request 34 includes the data pattern 33. In yet another example, a user identifier is passed to the remote device 13 by, for example, a cookie provided to the network device 30 or an attachment to a link in the variant manifest provided to the remote device 13. The network device 30 may, upon receiving a next request 34, send a start-over response and flag a table entry corresponding to the user identifier to indicate that a start-over response has been sent. Responsive to receiving another request 36, correlating the next request to the user identifier, and checking the table, the network device 30 may observe the flagged table entry. Because the table entry is flagged, the network device 30 may determine to not send a start-over response for another request 36, e.g. may send the response 39.

In the above examples, information such as a time of receipt, code indicating the time of receipt, user identifier, etc. may be passed to the remote device 13 using, for example, the data pattern 33 or a cookie. In other examples, the network device 30 may not pass such information to the remote device 13. In an example, the network device 30 always returns a truncated version of a stream manifest or a bootstrap current media time. A bar in the known video player may not show some future segments or fragments, but will start at a beginning of the content.

Figure 4:
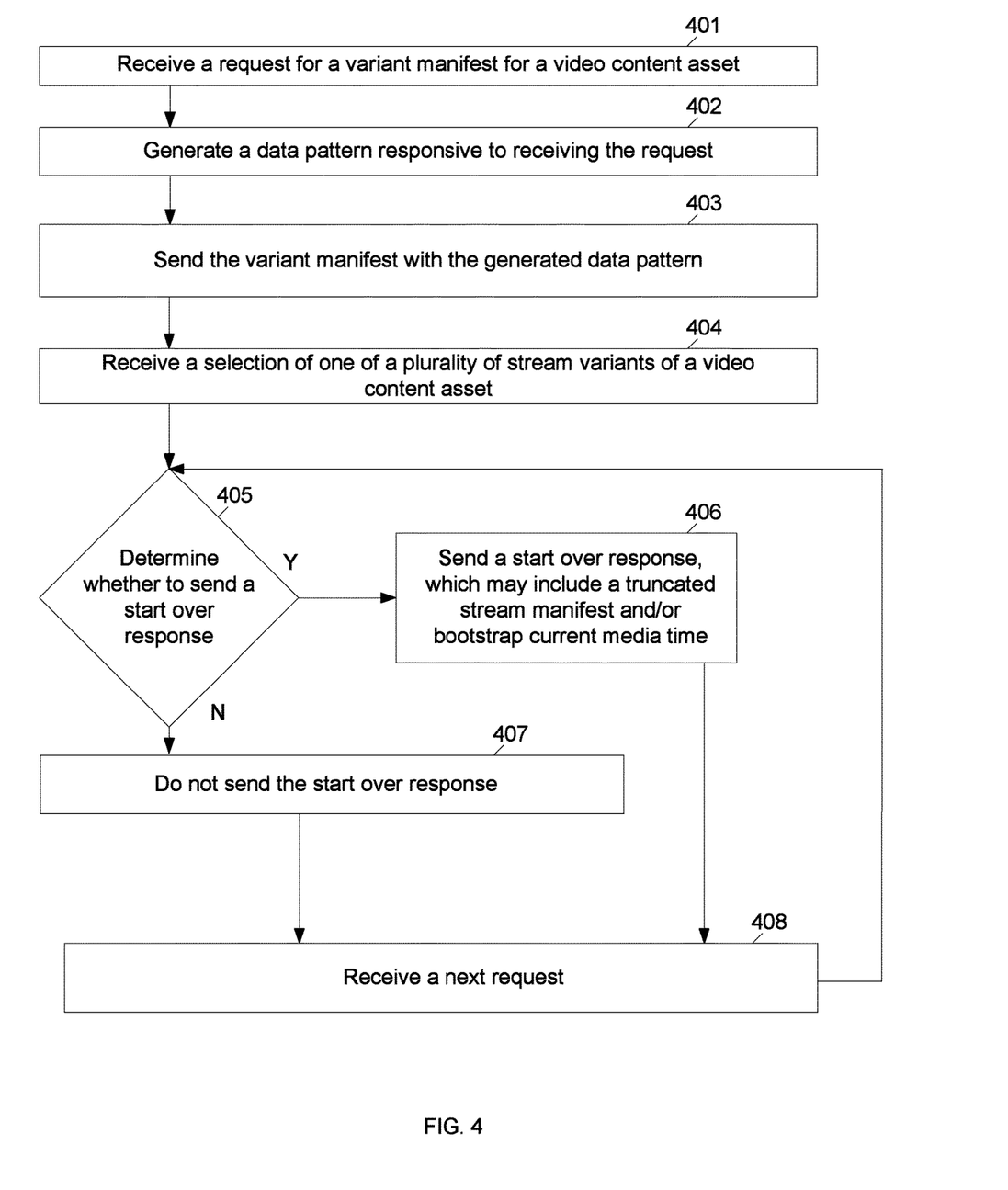
FIG. 4 illustrates a flow chart showing operating of the one or more network devices of FIG. 3.

FIG. 4 illustrates a flow chart showing operating of the one or more network devices of FIG. 3.

In block 401, the network device 30 receives a request for a variant manifest for a video content asset. In block 402, the network device 30 generates a data pattern responsive to receiving the request. In block 403, the network device 30 sends the variant manifest with the generated data pattern.

In block 404, the network device 30 receives a selection of one of a plurality of stream variants of a video content asset. In diamond 405, the network device 30 determines whether to send a start-over response. In response to determining to send the start-over response, in block 406 the network device 30 sends a start-over response, which may include a truncated stream manifest and/or a bootstrap current media time. In response to determining to not send the start-over response, in block 407 the network device 30 does not send the start-over response.

In block 408, the network device 30 may receive a next request. Processing may return to diamond 405 for the next request.

Figure 5:
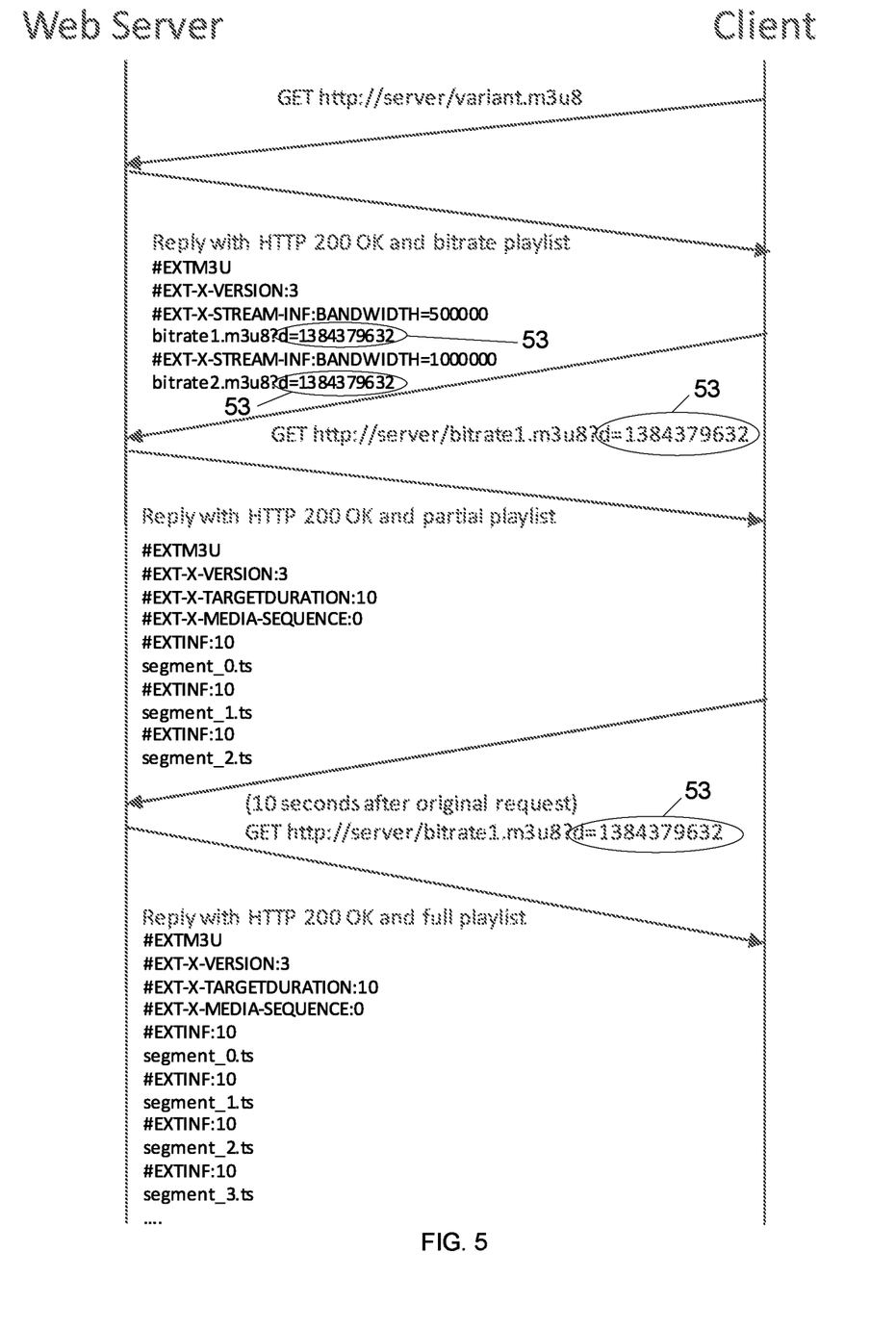
FIG. 5 illustrates signaling diagrams utilized in an example system for start-over in adaptive streaming.
Figure 6:
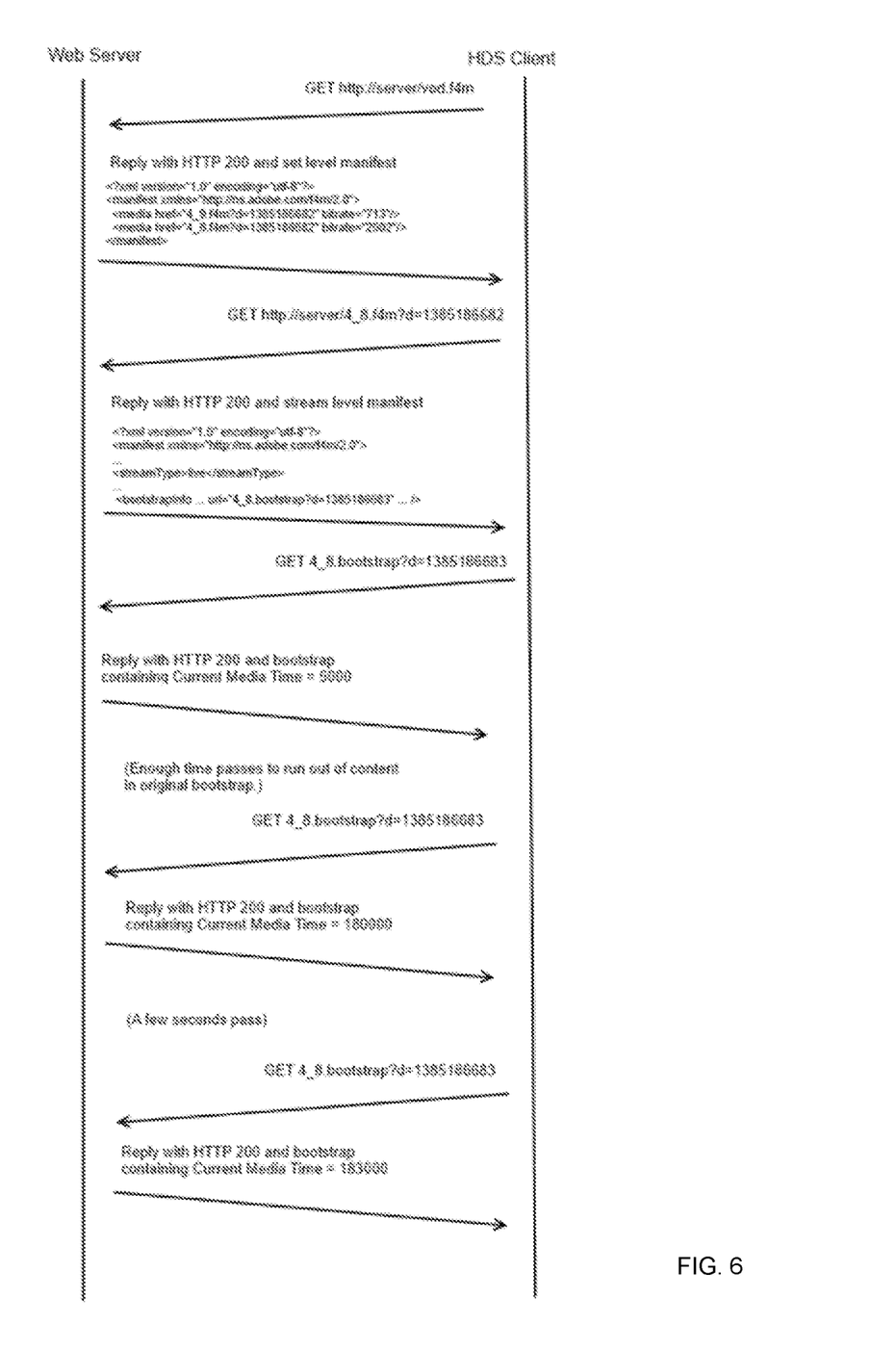
FIG. 6 illustrates signaling diagrams utilized in another example system for start-over in adaptive streaming.

FIGS. 5-6 illustrate signaling diagrams utilized in an example system for start-over in adaptive streaming. The signaling diagram of FIG. 5 utilizes principles described with respect to FIG. 3; a data pattern 53 similar to data pattern 33 is attached to URLs. The data pattern 53 is the parameter following the question mark. FIG. 6 also utilizes principles described with respect to FIG. 3 with regard to an HDS client.

It will be obvious to those having skill in the art that many changes may be made to the details of the above-described embodiments without departing from the underlying principles of the invention. The scope of the present invention should, therefore, be determined only by the following claims.

Most of the equipment discussed above comprises hardware and associated software. For example, the typical electronic device is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. A method, comprising:
   receiving, from a remote device, a request for a variant manifest of a video content asset available for adaptive streaming;
   generating a data pattern specifying a first time value corresponding to the receipt of the request for the variant manifest;
   providing the variant manifest to the remote device, the variant manifest including a pointer to the data pattern;
   generating a request for a selection, the request including the pointer to the data pattern;

receiving, from the remote device, the selection of the variant manifest from a plurality of stream variants of the video content asset;

identifying the data pattern based at least in part on the pointer;

comparing the first time value to a second time value to generate a result; and sending a start-over response to the remote device based at least in part on the result.

2. The method of claim 1, further comprising:

determining that the result is less than a threshold; and sending the start-over response.

3. The method of claim 1, wherein the start-over response comprises a truncated version of the variant manifest.

4. The method of claim 1, wherein the start-over response comprises a bootstrap current media time that is different than an actual current media time, wherein the bootstrap current media time comprises an HTTP Dynamic Streaming (HDS) bootstrap.

5. The method of claim 1, wherein the start-over response is associated with an initial media time of the video content asset that occurs before an actual current media time of the video content asset.

6. A computing system, comprising:

a computing device processor;

a memory device including instructions that, when executed by the computing device processor, enable the computing system to:

receive, from a remote device, a request for a variant manifest of a video content asset available for adaptive streaming;

generate a data pattern specifying a first time value corresponding to the receipt of the request for the variant manifest;

provide the variant manifest to the remote device, the variant manifest including a pointer to the data pattern;

receive, from the remote device, a selection of the variant manifest from a plurality of stream variants of the video content asset;

determine whether to send a first truncated stream manifest of the variant manifest;

determine to not send the first truncated stream manifest of the variant manifest; and send, to the remote device, a second stream manifest of the variant manifest that is different than the first truncated stream manifest.

7. The computing system of claim 6, wherein the instructions, when executed further enable the computing system to:

receive, from the remote device, a selection of the variant manifest from a plurality of stream variants of the video content asset, the selection including a parameter that indicates a time of receipt of the request for the variant manifest;

determine a difference between a time of receipt of the selection of the variant manifest and the first time value;

determine that the difference is less than a threshold; and send a start-over response with the variant manifest to the remote device.

8. The computing system of claim 7, wherein the start-over response comprises a truncated version of the variant manifest.

9. The computing system of claim 7, wherein the start-over response comprises a bootstrap current media time that is different than an actual current media time, wherein the bootstrap current media time comprises an HTTP Dynamic Streaming (HDS) bootstrap.

10. The computing system of claim 7, wherein the start-over response is associated with an initial media time of the video content asset that occurs before an actual current media time of the video content asset.

11. The computing system of claim 6, wherein the instructions, when executed further enable the computing system to:

receive, from the remote device, a selection of the variant manifest from a plurality of stream variants of the video content asset;

generate a request for the selection, the request including the pointer to the data pattern;

identify the data pattern based at least in part on the pointer;

compare the first time value to a second time value to generate a result; and send a start-over response to the remote device based at least in part on a result.

12. A non-transitory computer-readable storage medium including instructions that, when executed by at least one processor of a computing device, cause the computing device to:

receive, from a remote device, a request for a variant manifest of a video content asset available for adaptive streaming;

generate a data pattern specifying a first time value corresponding to the receipt of the request for the variant manifest;

provide the variant manifest to the remote device, the variant manifest including a pointer to the data pattern;

receive, from the remote device, a selection of the variant manifest from a plurality of stream variants of the video content asset;

determine whether to send a first truncated stream manifest of the variant manifest;

determine to not send the first truncated stream manifest of the variant manifest; and send a second stream manifest of the variant manifest that is different than the first truncated stream manifest to the remote device.

13. The non-transitory computer-readable storage medium of claim 12, wherein the instructions, when executed further enable the computing device to:

receive, from the remote device, a selection of the variant manifest from a plurality of stream variants of the video content asset, the selection including a parameter that indicates a time of receipt of a request for the variant manifest;

determine a difference between a time of receipt of the selection of the variant manifest and the first time value;

determine that the difference is less than a threshold; and send a start-over response with the variant manifest to the remote device.

14. The non-transitory computer-readable storage medium of claim 13, wherein the start-over response comprises a truncated version of the variant manifest.

15. The non-transitory computer-readable storage medium of claim 13, wherein the start-over response comprises a bootstrap current media time that is different than an actual current media time, wherein the bootstrap current media time comprises an HTTP Dynamic Streaming (HDS) bootstrap.

16. The non-transitory computer-readable storage medium of claim 13, wherein the start-over response is associated with an initial media time of the video content asset that occurs before an actual current media time of the video content asset.

17. The non-transitory computer-readable storage medium of claim 12, wherein the instructions, when executed further enable the computing device to:
receive, from the remote device, a selection of the variant manifest from a plurality of stream variants of the video content asset;
generate a request for the selection, the request including the pointer to the data pattern;
identify the data pattern based at least in part on the pointer; compare the first time value to a second time value to generate a result; and
send a start-over response to the remote device based at least in part on a result.

\* \* \* \* \*